United States Patent [19]

Hitchens et al.

[11] Patent Number: 4,512,747

[45] Date of Patent: Apr. 23, 1985

[54] MATERIAL CONVEYING SYSTEM SIMULATION AND MONITORING APPARATUS

[76] Inventors: Max W. Hitchens, 532 Timber Ridge Dr., #301A; George B. Rote, 614 Willow Wood Dr., #107, both of Carol Stream, Ill. 60187

[21] Appl. No.: 339,139

[22] Filed: Jan. 13, 1982

[51] Int. Cl.³ ............................................. G09B 25/02
[52] U.S. Cl. ................................ 434/428; 364/578; 364/150; 364/151; 364/478
[58] Field of Search ............... 434/219, 307, 323, 365, 434/366, 428; 364/578, 801–806, 148–151, 478, 364/479, 468, 469, 900,200; 414/135, 136; 198/340, 198/341

[56] References Cited

U.S. PATENT DOCUMENTS

| | | | |
|---|---|---|---|
| 3,294,924 | 12/1966 | Fein | 434/219 |
| 3,451,147 | 6/1969 | Mehlig et al. | 434/219 |
| 3,688,414 | 9/1972 | Koehlinger et al. | 434/219 |
| 3,824,624 | 7/1974 | Carlson et al. | 364/802 |
| 3,826,906 | 7/1974 | Carlson et al. | 364/802 |
| 3,832,534 | 8/1974 | Carlson et al. | 364/801 |
| 3,839,629 | 10/1974 | Russell | 364/802 |
| 3,863,270 | 1/1975 | Haley et al. | 364/802 |
| 3,903,402 | 9/1975 | Petit et al. | 364/801 |
| 3,912,912 | 10/1975 | Pollock et al. | 364/148 |
| 4,060,915 | 12/1977 | Conway | 434/362 |
| 4,120,629 | 10/1978 | Christian et al. | 414/136 |
| 4,167,821 | 9/1979 | Gibson et al. | 434/219 |
| 4,213,175 | 7/1980 | Kurihara | 364/150 |
| 4,231,087 | 10/1980 | Hunsberger et al. | 364/200 |
| 4,338,659 | 7/1982 | Kurakake | 364/150 |
| 4,358,822 | 11/1982 | Sanchez | 364/151 |
| 4,373,185 | 2/1983 | Mills et al. | 364/478 |

Primary Examiner—Richard C. Pinkham
Assistant Examiner—MaryAnn Stoll Lastova
Attorney, Agent, or Firm—Hill, Van Santen, Steadman & Simpson

[57] ABSTRACT

An automatic apparatus employed to simulate material conveying hardware and sensors to test control systems for factories and warehouses. The simulated conveying system is displayed on a color graphics CRT with the state of the input and output signals and a graphic representation of individual packages. Animation provided by the invention allows system operation to be observed. An attached operator's console has a command menu with functions to control the simulation. The simulated system may be started, stepped, stopped and the reaction of the control system observed on the color graphic CRT. Scenarios which represent the expected operation of the conveying system, may be set up to exercise the control system and determine system operation under stress or unusual operating conditions. The device may also be used to monitor an installed conveying system and provide diagnostic capabilities when actual operation does not meet expected operation.

9 Claims, 10 Drawing Figures

MATERIAL CONVEYING SYSTEM SIMULATION AND MONITORING APPARATUS

BACKGROUND OF THE INVENTION

Many new factories and warehouses contain large, complex systems to convey material within the facility and through the shipping and receiving areas. These systems often cover a large area and include many different pieces of equipment. For instance, computers and programmable controllers are used to control such systems and automatically route materials through the facility. Testing for proper operation of these systems is a difficult process.

In the prior art, testing of material conveying systems has been done using the actual system to verify proper operation. In some instances, special test fixtures have been built with switches connected to inputs and with indicators connected to the outputs of the system controller to provide simple GO/NO GO checks. Testing of the conveying system under fully loaded conditions was difficult and in most cases impossible.

This resulted in the conveying system not being stressed until the factory or warehouse was operating at full capacity. Often, many years elapse between initial installation and full capacity on very large systems.

The purpose of this invention is to simulate the actual material conveying system operating by imitating the movement of packages, operation of solenoids, transfer diverters, and other process machinery. The operation of the simulated system is shown using animation on a color graphic cathode ray tube (CRT) display. This enables the system designer to observe system operation prior to installation.

The apparatus according to this invention reduces the time and expense required to implement and test a material conveying system.

SUMMARY OF THE INVENTION

Briefly described the invention comprises an apparatus and method for simulating a conveyor system and displaying the simulated system operation on a color graphic CRT so the operation of the simulated system can be observed.

The invention simulates the conveyor and mechanical hardware by imitating the signal responses of the conveyor system to control outputs. All signals representing the control outputs of the system controlling device are read, processed, and inputs representing the current state of the conveyor system are returned to the system controlling device. The invention operates in real time to duplicate the signal timing of events as they would take place in the actual conveyor system.

The invention connects to the conveying system's computer, programmable controller, or other control device in place of the real control hardware and sensors. The conveyor system control device processes inputs provided by the sensors on the conveying system and generates control outputs. The control device outputs are read by the invention and a new set of sensor inputs are provided to the control device. The logic or program in the conveyor system's control device remains intact so that no changes are required to go from simulated to actual operation.

The invention processes the control device output signals, updates the packages locations, displays the simulated operation, and provides control input signals. Commands from an operator's console control the operation of the simulated system.

A color graphic CRT displays the state of the simulated system at all times. The location of the simulated packages is periodically updated to create a visual representation of their movements. As packages move through the system their current positions are graphically displayed. If a motor driving a conveyor section containing a package is turned ON the package progress is displayed as it moves through the system. The state of the input/output (I/O) signals is displayed on the color graphic CRT. When the I/O signal is OFF it is displayed as a colored mnemonic on a background of black. An ON I/O signal is represented with the mnemonic in black on a colored background. The status of the simulation is displayed on the bottom line of the color graphic CRT.

An operator's console has commands to start, stop, and step the simulation, place and remove loads, change I/O signals, edit and activate scenarios, and display package status.

The invention utilizes data provided by a host computer which has "fill in the blanks" tables to enter all conveying system parameters for operation. Each conveyor section or device is described with length, speed, location of photo-electric sensors, limit switches, and/or other devices. Features such as process machinery, lift mechanisms, elevators, and sizing elements are also described in the tables.

The simulation tables are loaded into the invention's non-volatile memory. Once the tables have been loaded, connection to the host computer is no longer required.

These and other features of the invention will be more fully understood with reference to the following drawings and detailed description of the preferred embodiment.

DETAILED DESCRIPTION OF THE PRESENTLY PREFERRED EMBODIMENTS

During the course of this description like numbers will be used to indicate like elements according to the different figures illustrating the invention.

1. Equipment and General Operation

Figure 1:
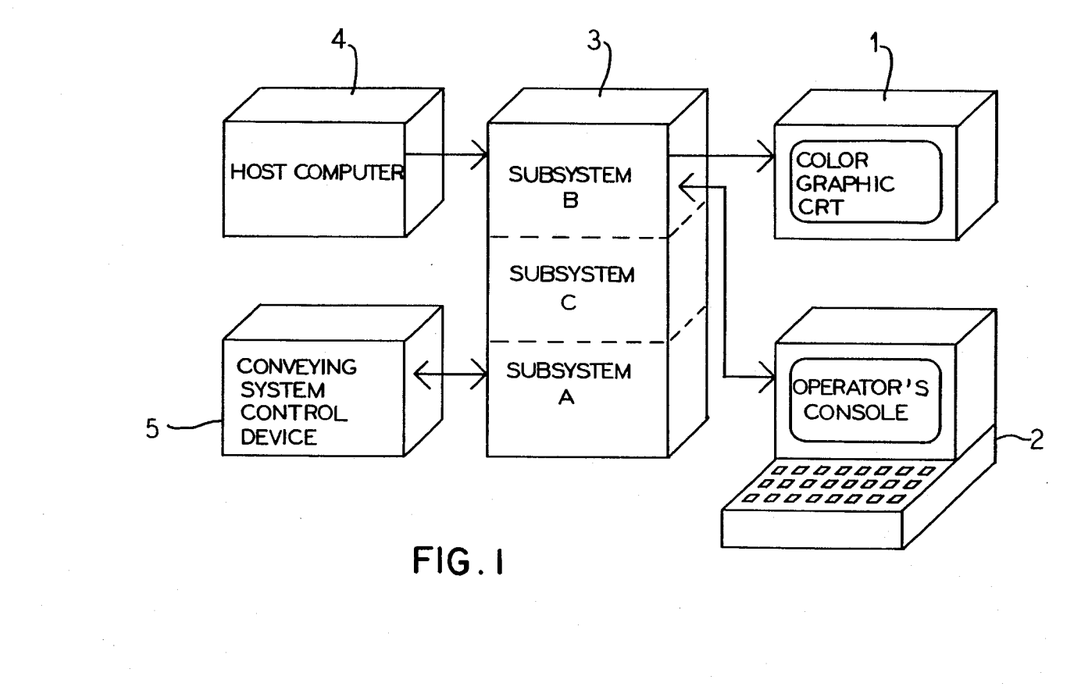
FIG. 1 is a functional block diagram showing the use of the invention.
Figure 2:
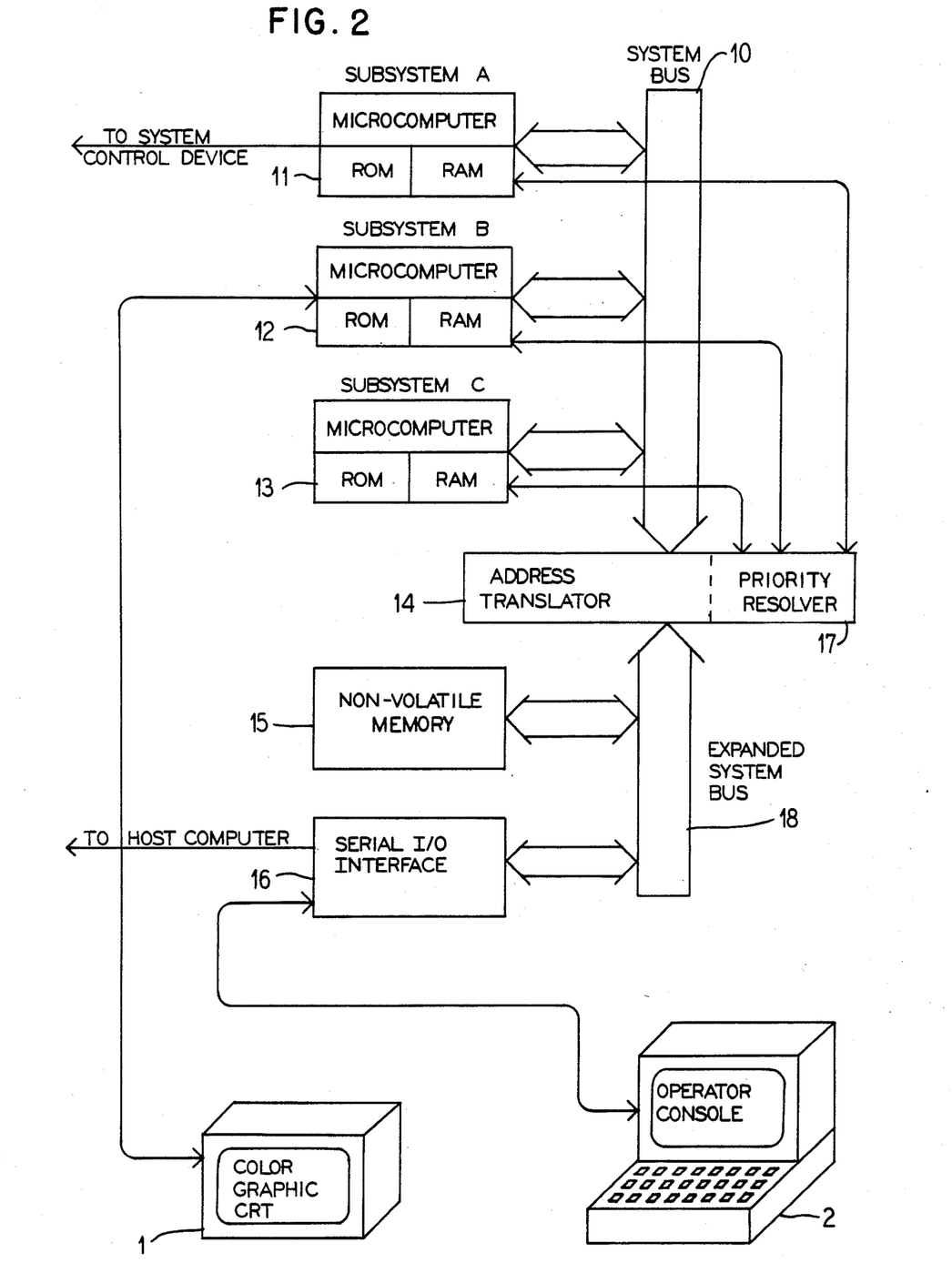
FIG. 2 is a block diagram showing the interrelationship of the major components of the invention.

FIG. 1 shows a block diagram of the invention in use. The invention is comprised of elements (1, 2, and 3). Element 1 is the Color Graphic CRT, element 2 is the Operator's Console, and element 3 is the embodiment of the remaining conponents of the invention. A detailed breakdown of element 3 is shown in FIG. 2. The host computer (4) and the conveying system control device (5) are supplied by the user of the invention and are not part of the invention embodiment.

The host computer (4), is a general purpose data processing computer which contains the software and data processing capability necessary to generate and manage the data tables which define the material conveying system to the invention. The conveying system control device (5), is the computer, programmable controller, or discrete logic needed to control the conveying system. Table I is a list of the major components of the invention seen in FIGS. 1, 2, and 3.

TABLE I

Figure 3:
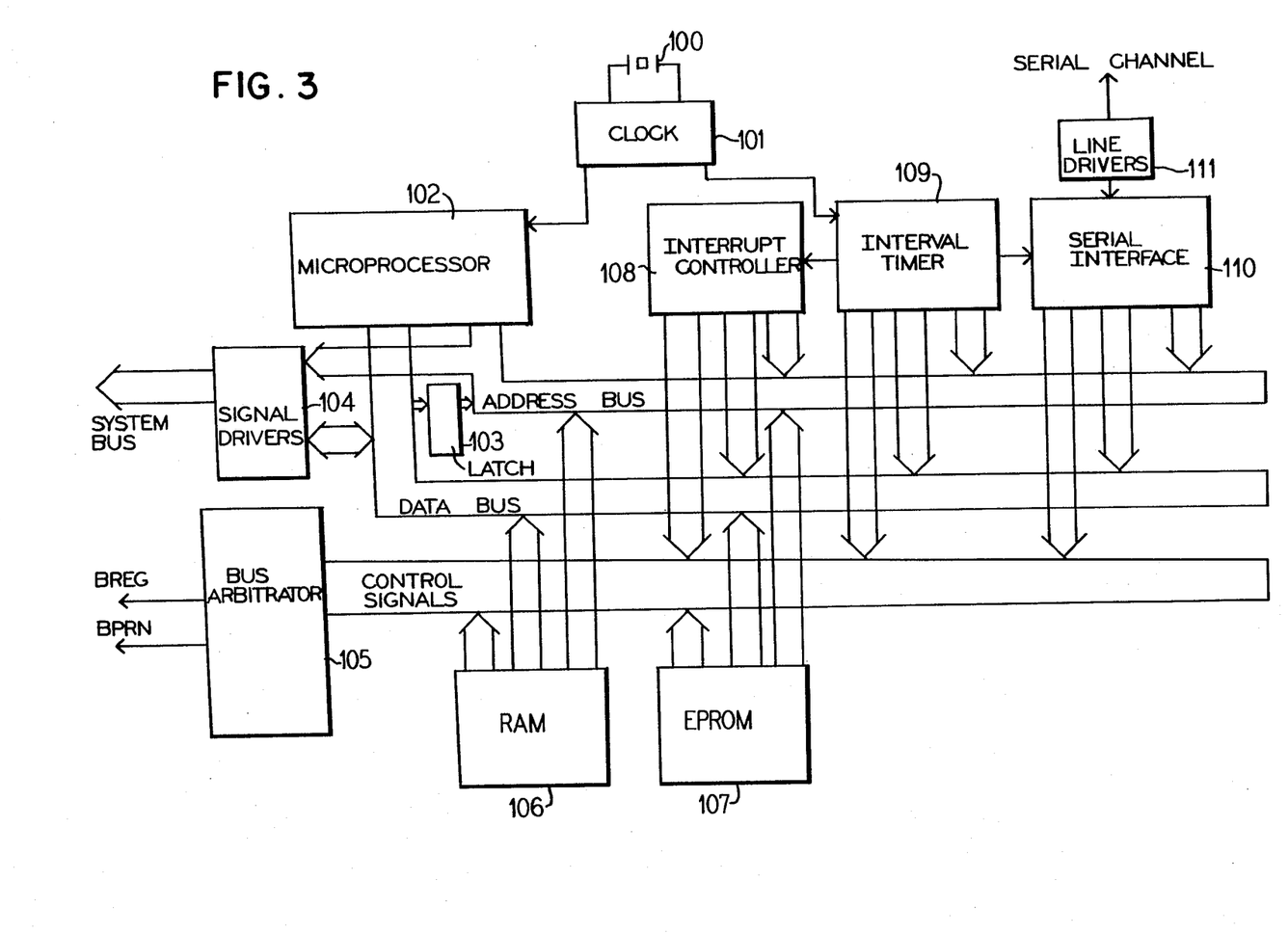
FIG. 3 is a detailed diagram of the preferred embodiment for the invention microcomputers.

| ELEMENT # | ELEMENT | PREFERRED EMBODIMENT |
|---|---|---|
| 1 | Color Graphics Display | Model 8001G Intelligent Systems, Inc. Norcross, GA |
| 2 | Operator's Console | Model ADM-3A Lear Siegler, Inc. Anaheim, CA |
| 10, 18 | System Bus with Expansion | B1013 Central Data Corp. Champaign, IL |
| 11 | Subsystem "A" Microcomputer | H100001 HEI Corp. Carol Stream, IL |
| 12 | Subsystem "B" Microcomputer | H100001 HEI Corp. Carol Stream, IL |
| 13 | Subsystem "C" Microcomputer | HE100001 HEI Corp. Carol Stream, IL |
| 14, 17 | Address Translator and Priority Resolver | H103001 HEI Corp. Carol Stream, IL |
| 15 | Non Volatile Memory | H104001 HEI Corp. Carol Stream, IL |
| 16 | Serial I/O Interface | SBC 534 Intel Corp. Santa Clara, CA |
| 100 | Crystal | 19.3536 Mhz .01% Quartz Crystal International Crystal Mfg. Co., Inc. Oklahoma City, OK |
| 101 | Clock | 8224 Intel Corp. Santa Clara, CA |
| 102 | Microprocessor | 8085A-2 Intel Corp. Santa Clara, CA |
| 103 | Latch | 74S373 Texas Instruments, Inc. Dallas, TX |
| 104 | Signal Drivers | 8283 Intel Corp. Santa Clara, CA |
| 105 | Bus Arbitrator | 3018 Intel Corp. Santa Clara, CA |
| 106 | RAM | 8185-2 Intel Corp. Santa Clara, CA |
| 107 | EPROM | 2732A Intel Corp. Santa Clara, CA |
| 108 | Interupt Controller | 8259A Intel Corp. Santa Clara, CA |
| 109 | Interval Timer | 8253C-2 NEC Microcomputers, Inc. Wellesley, MA |
| 110 | Serial Interface | 8251A |
| 111 | Line Drivers | Intel Corp. Santa Clara, CA LM1488N National Semiconductor Corp. Santa Clara, CA |

The interrelationship of the foregoing elements will be better understood by the following brief description of the operation of the invention. A more detailed description of the operation follows in subsequent sections of this disclosure.

Figure 8:
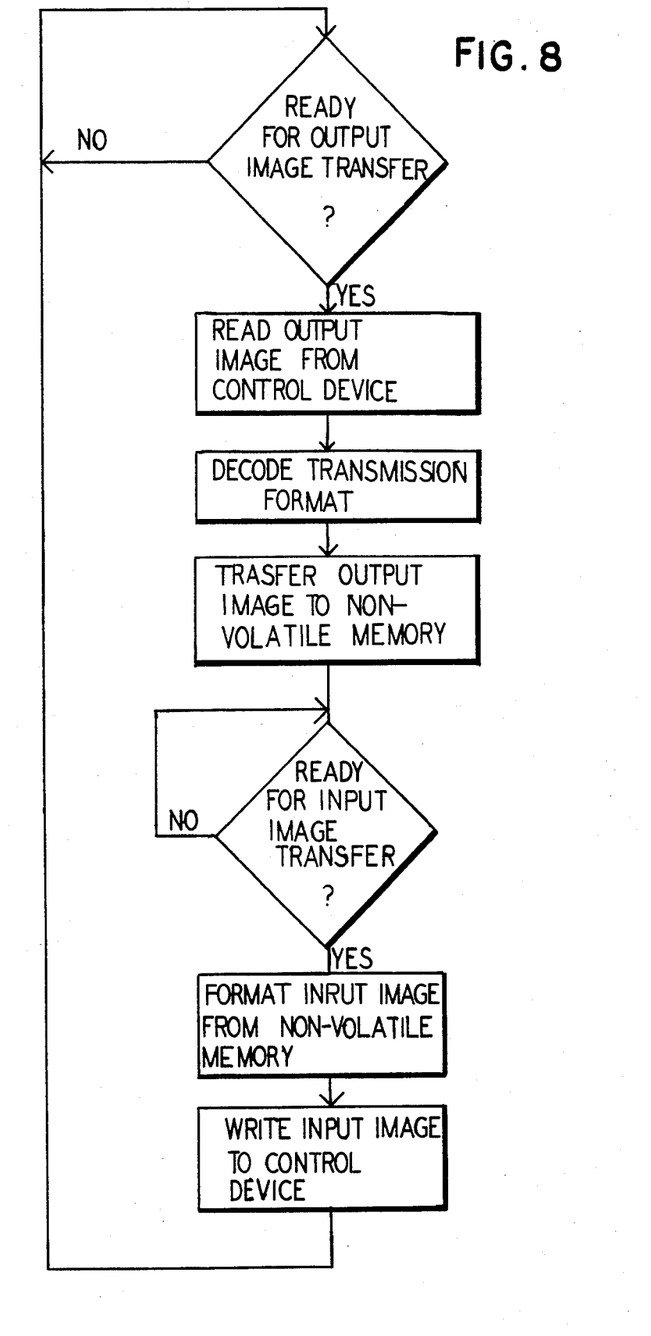
FIG. 8 is a flow diagram of the functions of the subsystem A microcomputer.

The conveying system control device (5) is the user supplied device which ultimately operates the system in the factory or warehouse. It connects to the subsystem A microcomputer (11) which contains internal RAM (106) and EPROM (107) memory with communication capability to the other microcomputer subsystems via the system bus (10). The subsystem A microcomputer (11) reads in the signals' generated by the system control device (5) decodes the transfer format and creates an image of all output signals in the system non-volatile memory (15). A subsystem C micrcomputer (13) with internal RAM (106) and EPROM (107) takes this output image and using the system tables in conjunction with the simulated packages locations generates an updated input image which corresponds to the sensors on the conveying system. The input image is placed in non-volatile memory (15) where the subsystem A microcomputer (11) formats the input image and transfers it to the system control device (5). FIG. 8 shows the flow diagram for the subsystem A microcomputer (11). The subsystem B microcomputer (12) interfaces to the color graphic CRT (1) directly using the on-board serial channel. Any time an input or output signal currently on display changes or the graphic representation of a package location changes, the image on the color graphic CRT is updated.

Figure 9:
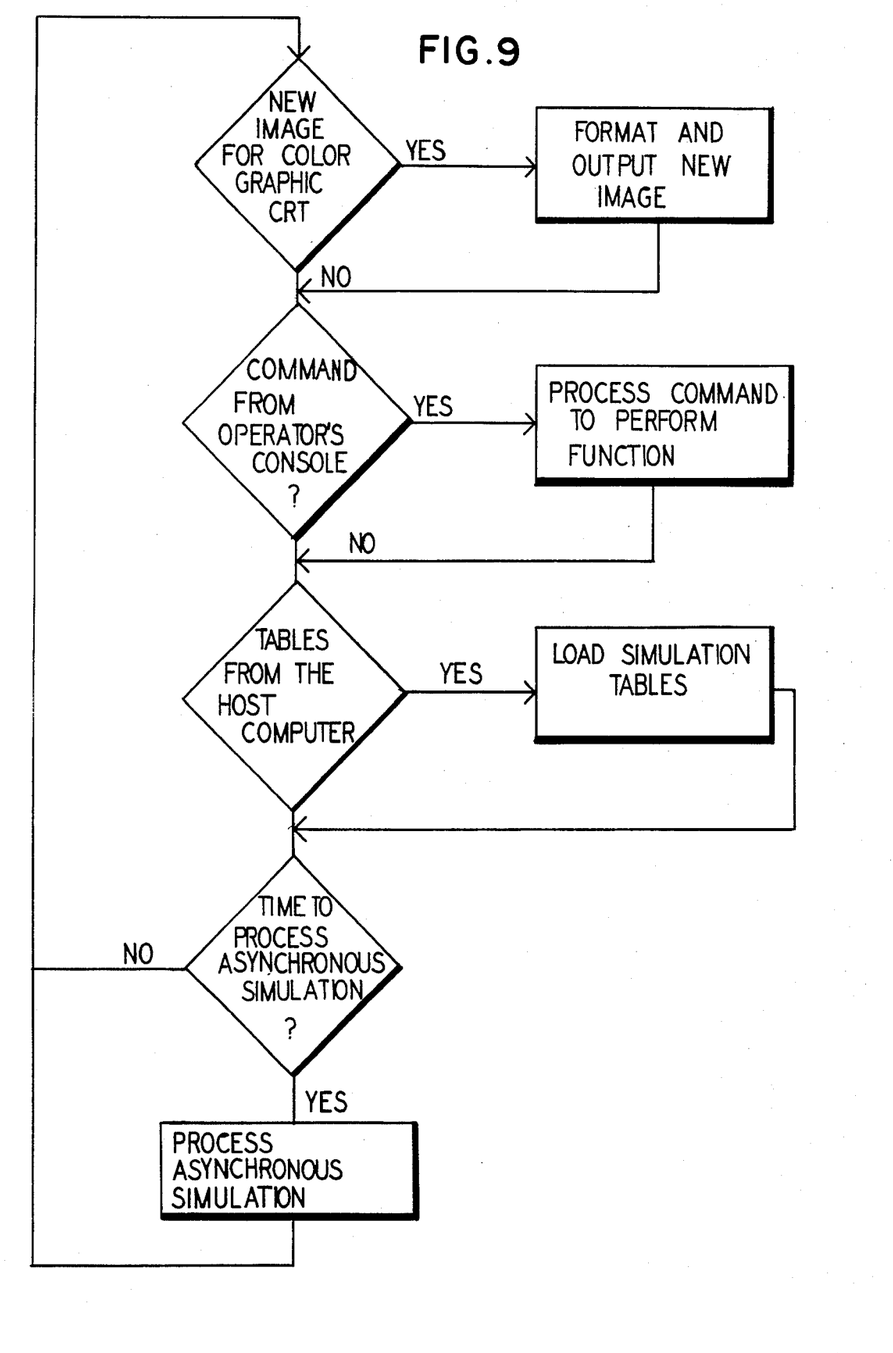
FIG. 9 is a flow diagram of the functions of the subsystem B microcomputer; and, FIG. 10 is flow diagram of the functions of the subsystem C microcomputer.

The subsystem B microcomputer (12) interfaces to the operator's console (2) via the system bus (10) and the serial I/O interface (16). When a command is entered on the operator's console (2), the command is processed by the subsystem B microcomputer (12) to perform the specified function. The subsystem B microcomputer (12) also processes asynchronous simulation tables which simulate all conveying lifts, elevators, or other transfer devices. The flow diagram for subsystem B microcomputer (12) is shown in FIG. 9.

The subsystem C microcomputer (12) processes the simulation tables and maintains a memory image of the current simulated package locations in the non-volatile memory (15) so that when the input image is read by the subsystem A microcomputer (11) an updated output image can be generated. If the outputs in the ouptut image cause a package to move and activate an input sensor, the input image is updated to reflect the change. The subsystem C microcomputer (13) processes simulated packages that are placed into the simulation by the system B microcomputer (12) in response to a command from the operator's console (2). The processing is performd by the subsystem C microcomputer (13) on a periodic basis so the system simulation is performed in real time, i.e., one second of simulated time represents one second of actual conveying system performance.

Figure 10:
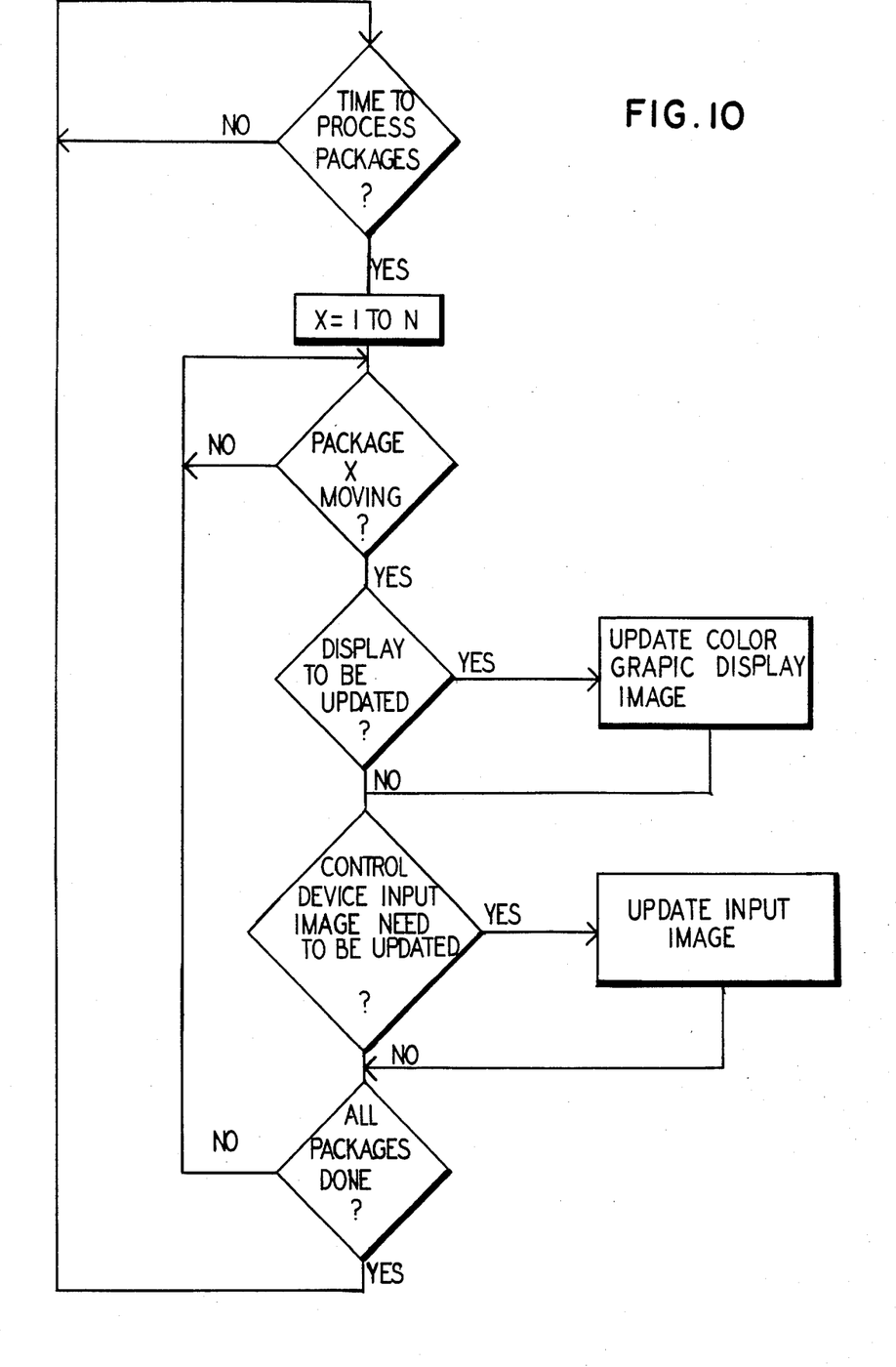

The flow diagram for subsystem C microcomputer (13) is shown in FIG. 10.

A priority resolver (17) allows the system bus (10) to be used by any one of the three microcomputers (11, 12, 13). The microcomputer's 16 bit address is expanded to a 20 bit address by the address translator (14). The 20 bit address is used on the expanded system bus (18) to access the memory and I/O section of the invention.

Figure 6:
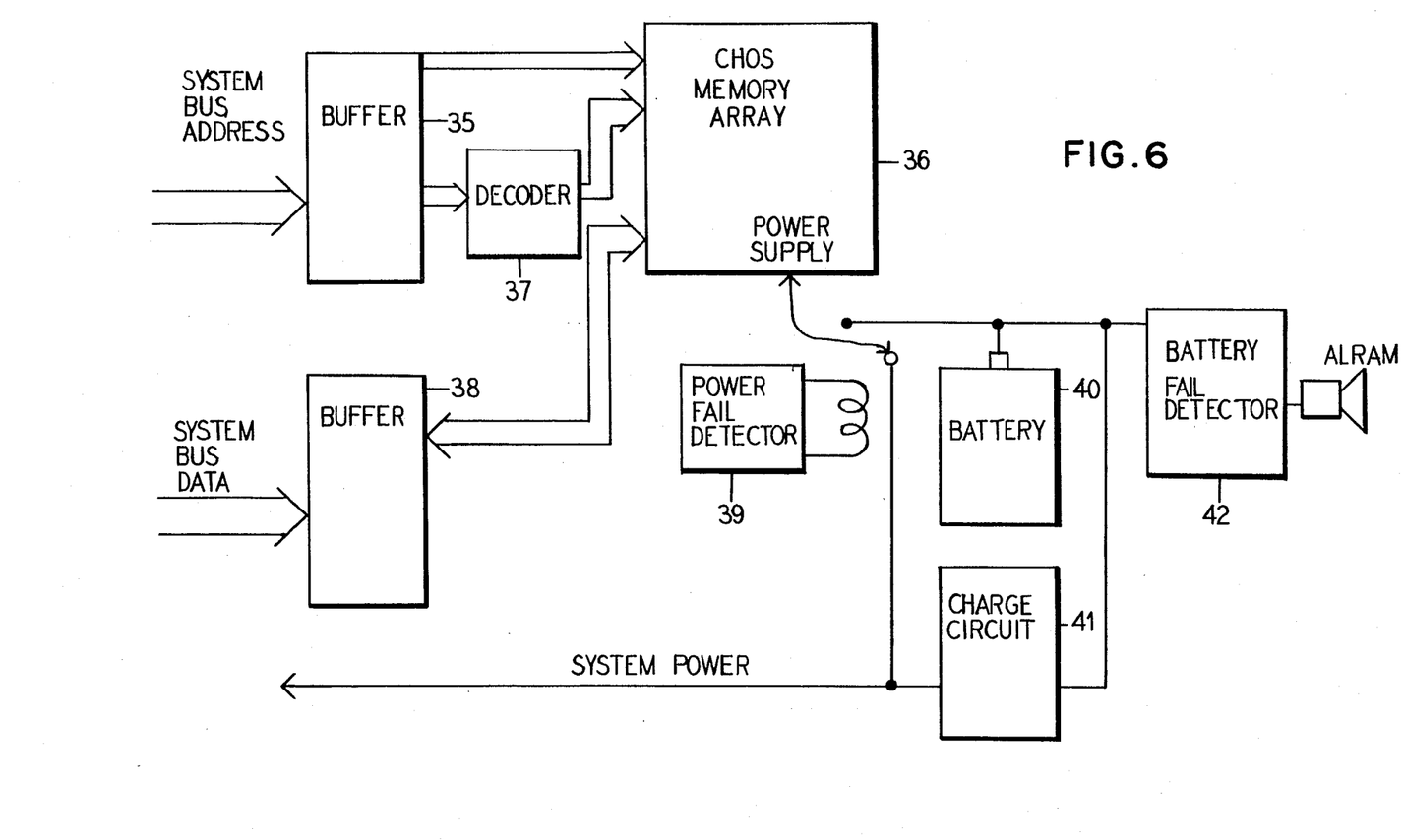
FIG. 6 is a detailed diagram of the non-volatile memory.

The non-volatile memory (15) is comprised of CMOS memory chips of the HM6116LP-4 type, organized so that memory from 32 kilobytes to over 1 megabyte may be used. The memory size of the invention corresponds to the size of the material conveying system being simulated. In the case of a power failure, the CMOS memory is switched via a relay to a battery backup to maintain the simulation data and tables. The serial I/O interface (16) provides RS232 channels to communicate between the operator's console (2) and the host computer (4) and the subsystem B microcomputer (12).

2. Detailed Structure

The microcomputers (11, 12, 13) are identical in construction. FIG. 3 contains the block diagram of the microcomputer which is used in the three subsystems.

Microcomputer timing is generated by the clock generator (101) in conjunction with a step-down counter. A 19.3536 MHz crystal (100) is used as a reference. These circuits produce three basic timing rates: a 9.68 MHz signal used for the microprocessor (102), a 2.15 MHz signal, and a 4.48 MHz signal for the interval timer (109).

The microprocessor (102) performs system processing functions and generates the address and control signals required to access memory and I/O devices. Common pins are used to multiplex the 8-bit input/output data and the lower 8 bits of the address. During the first part of machine cycle the lower 8 bits of address are strobed into a latch (103). The outputs of the latch (103) are combined with the upper 8 bits of the address to form the 16 bit address.

The microcomputer has 4K bytes of Random Access Memory (106) utilizing devices which are directly compatible with the microprocessor (102). RAM addressing is set to $7000_{16}$–$7FFF_{16}$. Up to four Erasable Programmable Read Only Memory devices (107) are used to provide up to 16K bytes of logic storage. The EPROM device (107) address space is from 0 to $3FFF_{16}$.

Eight interrupts can be connected to the interrupt controller (108) and four interrupts connect directly to the microprocessor (102). All interrupts, except the TRAP interrupt may be disabled. The TRAP interrupt is used for diagnostic purposes.

The interval timer (109) includes independently controlled counters used for a CPU interrupt and the baud rate timer. The baud rate timer provides a clock to the serial interface (110).

The serial interface (110) provides an RS232C compatible serial channel via the line driver (111). The transmission mode, character size, parity bits, stop bits, and baud rate is set by the microprocessor (102).

A system bus interface allows the microcomputer to share memory and I/O devices with other microcomputers. The interface consists of a bus arbitrator (105) and signal drivers (104).

The bus arbitrator (105) requests the use of the system bus through the bus priority resolver (7). When the microcomputer acquires control of the bus the appropriate memory or I/O command signals are generated.

Figure 4:
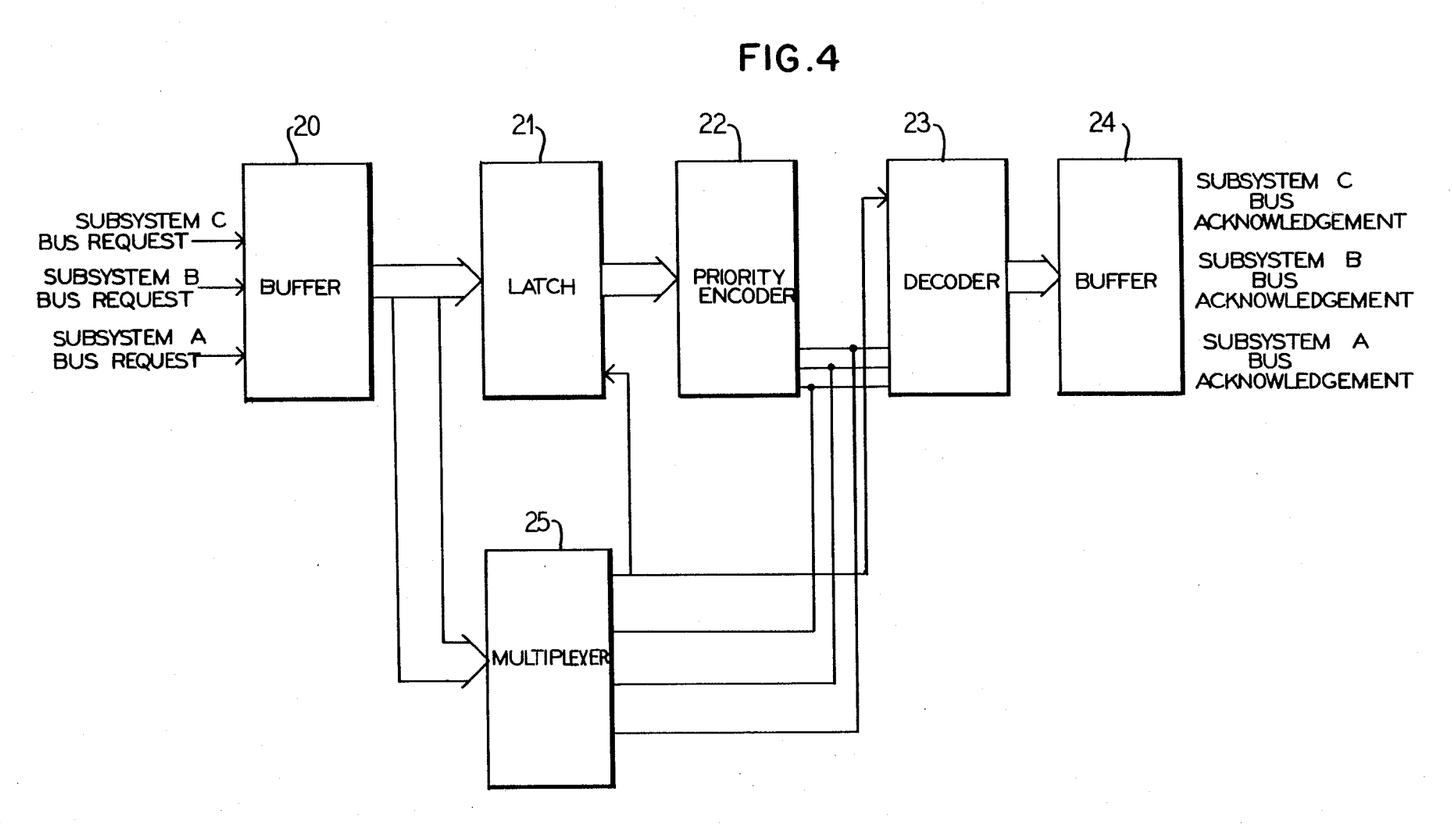
FIG. 4 is a detailed diagram of the priority resolver for the system bus.

FIG. 4 contains the block diagram of the system by priority resolver (17). The bus request signals from each subsystem are buffered using a 74LS241 intergrated circuit (20) then fed into a 74F373 latch (21) and a 74F151 eight line to one line multiplexer (25). The latch (21) feeds a 74148 priority encoder (22) which generates the three bit binary address of the highest priority request. This address goes back to the multiplexer (25) and the highest priority request signal is used to activate the latch (21). The priority encoder (22) also feeds a 74F138 decoder (23) which generates an acknowledge signal to the highest priority subsystem requesting the bus. The acknowledge signal is buffered using a 74LS241 intergrated circuit (24). When the subsystem microcomputer is finished with the bus, it releases the bus request causing the multiplexer (25) to release the latch (21) allowing the next bus request to be processed.

Figure 5:
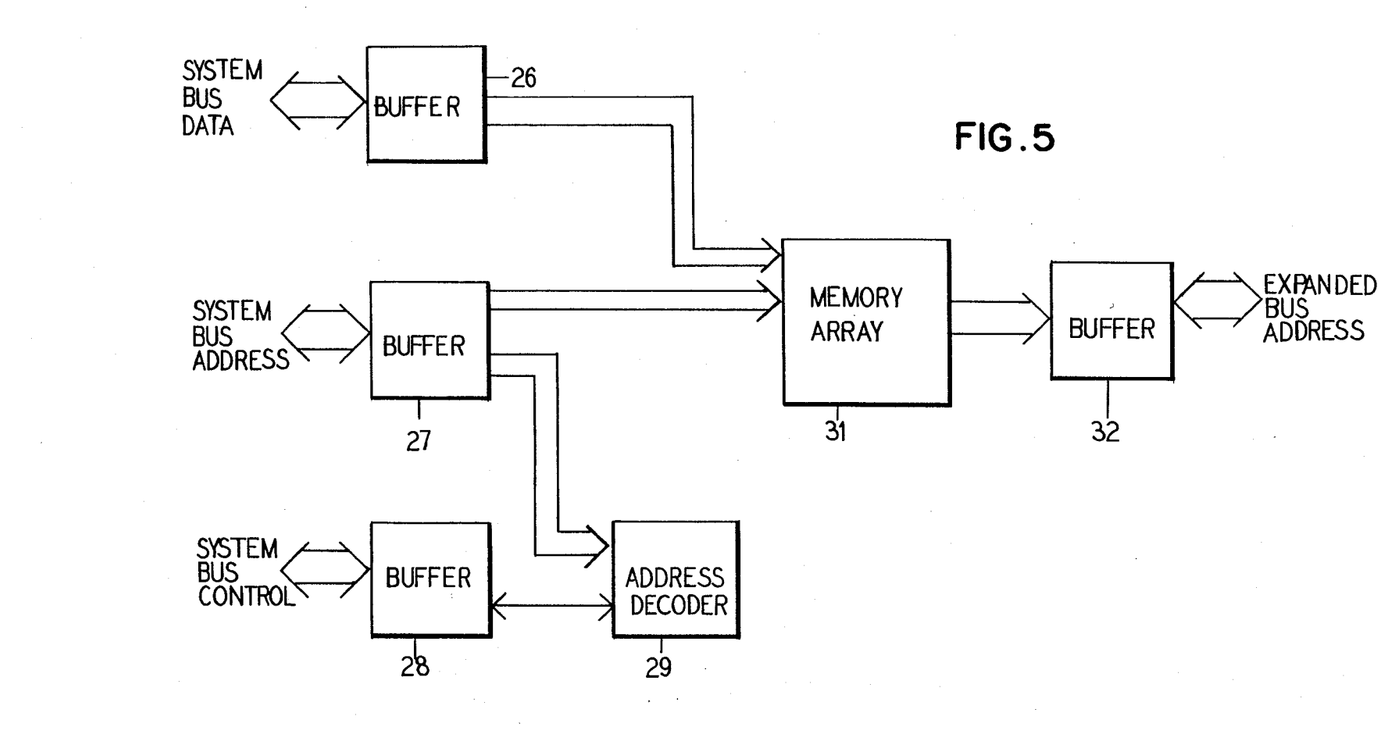
FIG. 5 is a detailed diagram of the address translator.

FIG. 5 contains the block diagram of the address translator (14). The address translator (14) translates the system bus sixteen bit address onto twenty bit expanded system bus (1). The address translation for each subsystem microcomputer (11, 12, 13) is programmable using I/O instructions from each subsystem. The translator decodes the address using 82S131 (29) ROM in conjuntion with the bus I/O control signals. If the translator is selected for programming, data is buffered using a 74LS240 integrated circuit (26) and written into the memory array (31).

All memory read and write operations of the subsystem microcomputers (11, 12, 13) go through the address translator (14). The upper four bits of the sixteen bit address on the system bus is buffered by 74F241 integrated circuits (27) to access a memory array (31) of 74F189 intergrated circuits expanding the four bits to eight bits. The eight bits are added to the twelve existing address bits to form the twenty bit address on the expanded system bus (18). Since the address translator (14) adds access time to every memory cycle it must operate at a very high speed. The address translation time is typically less than 30 nanoseconds.

A color graphic CRT (1) displays the state of the simulated system at all times. The location of the simulated packages is periodically updated to create a visual representation of their movements. As packages move through the system their current positions are graphically displayed. If a motor driving a conveyor section containing a package is turned on the package progress is displayed as it moves through the system. The state of the I/O signals is displayed on the color graphic CRT (1). When the I/O signal is OFF it is displayed as a mnemonic on a background of black. An ON I/O signal is represented with its mnemonic in black on a colored background. The status of the simulation is displayed on the bottom line of the color graphic CRT (1).

An operator's console (2) has commands to start, stop, and step the simulation, place and remove loads, change I/O signals, edit and activate scenarios, and display package status.

The invention utilizes a "fill in the blanks" table definition to enter all conveying system parameters for operation. Each conveyor section or device is described with length, speed, location of photo-electric sensors, limit switches, and/or devices. Features such as process machinery, lift mechanisms, elevators, and sizing elements are also described in the tables.

The simulation tables are processed and stored in a host computer system (4) then loaded into the invention's non-volatile memory (15). Once the tables have been loaded, connection to the host computer (4) is no longer required.

3. Microcomputer Operation

The microcomputers (11, 12, 13) are an integral part of the invention. They include among their important features the ability to track packages through the simulated system, interface to various control devices and update the color graphic CRT (1). In the preferred embodiment standard microprocessor and peripheral devices are employed to perform the functions previously described. However, it will be appreciated by those of ordinary skill in the art that certain of the functions, such as the control interface could also be "hard wired" into the electronics, thereby eliminating the use of the programmable microcomputer. It will be also appreciated by those of ordinary skill in the art that a variety of different microcomputers, minicomputers or mainframes could be configured to perform the same function and that a variety of different programs could be used on the same computer or other computers to produce the same results.

4. System Operation

After power-up or reset, the system tables are loaded via a serial link with the host computer (4). If the tables of the conveying system to be simulated are stored in non-volatile memory (15) no load is required. An initializiation command causes the system tables to be checked for validity. If the check fails, a TABLES INVALID message will be sent to the operator's console (2). The operator starts the transfer sequence at the host computer (4) then intitiates the load sequence on the invention by a command on the operator's console (2). After the system tables have been transferred, a LOAD COMPLETE message is sent to the operator's console (2).

An initialization command initiates the display of the simulated system on the color graphic CRT (1) with a graphic representation of the material conveying path and displaying the conveying system control device (5) input and output signals.

The control logic in the conveying system control device (5) is first checked out manually without processing any simulated packages. System input signals (limit switches, photo-electric sensors, etc.) are turned on and off using commands on the operator's console (2) and the controller output signals (motors, solenoids, etc.) are observed on the color graphic CRT (1). After the system control functions are verified by exercising the I/O signals, automatic simulation is used. A package is placed on the simulated system and it's actions and routing observed. The movement of the package and control signal activities are displayed on the color graphic CRT (1). The control logic is tested with the single package using commands on the operator's console (2) to verify the control logic for a single package. The simulation may be stopped, stepped, and restarted to diagnose the problem areas located. After the control logic is verified using single packages, multiple packages are placed on the simulated system to determine the over-all system flow and reaction to stress and unusual conditions. Scenarios are entered on the operator's console (2) to generate multiple package activity.

All simulation activities are initiated by commands on the operator's console (2). Table II contains these commands and their functions.

TABLE II

| FUNCTION | PARAMETERS* | DESCRIPTION |
|---|---|---|
| | | LOAD COMMANDS |
| LD | X | Load Tables |
| | | X = Load format |
| | | INPUT/OUTPUT COMMANDS |
| ON | AAAAAA | Turn on I/O Bit |
| | | AAAAAA = name of I/O |
| OF | AAAAAA | Turn off I/O Bit |
| | | AAAAA = name of I/O |
| PU | TTTTT AAAAA | Pulse I/O Bit |
| | | TTT = time in milliseconds (0-65000) |
| | | AAAAA = name of I/O |
| SW | (XXX) (YYYY) | Second word to Programmable Controller |
| | | XXX = address YYYY = data (Hex/BCD) |
| | | Default XXX = 0 |
| RW | (XXX) | Read Word from Programmable Controller |
| | | XXX = word address (octal) |
| | | Default XXX = 0 |
| | | CONTROL COMMANDS |
| IN | | Initialize Display |
| SS | (X) (TTTT) | Start Simulation |
| | | X = Scenario number, TTTT = starting time |
| | | Default TTTT = 0, X = no scenario |
| ST | (NN) | Step Simulation |
| | | NN = number of seconds for simulation |
| | | Default = 1 second |
| (ESC) | | Escape key - terminate simulation |
| RN | | Resume simulation |
| TS | | Terminate scenario |
| SX | | Suspend PC data transfer |
| RX | | Resume PC data transfer |
| DP | (X) (Y) | Display page |
| | | X = page number, Y = monitor number |
| | | Default X = 0 |
| | | SCENARIO COMMANDS |
| IS | | Initilize scenario data area |
| CI | NN | Input scenario data |
| CS | NN (DDDD$_1$) (DDDD$_2$) | Display scenario entries |

TABLE II-continued

| FUNCTION | PARAMETERS* | DESCRIPTION |
|---|---|---|
| | | NN = scenario number |
| | | $DDDD_1$ = start time or event |
| | | $DDDD_2$ = end time or event |
| | | Default $DDDD_2$ = not present display only |
| | | data for $DDDD_1$, $DDDD_1$ = not present |
| | | display entire scenario. |
| CX | NN ($DDDD_1$) ($DDDD_2$) | Delete scenario data |
| | | $DDDD_1$ = start time or event |
| | | $DDDD_2$ = end time or event |
| | | Default $DDDD_2$ = not present delete only |
| | | data for $DDDD_1$, $DDDD_1$ = not present |
| | | delete entire scenario |
| | | SIMULATION COMMANDS |
| TO | | Automatic trap enable |
| TF | | Automatic trap disable |
| P1 | CC (LL) | Place package type 1 in simulation |
| | | CC = conveyor, LL = location |
| | | Default LL = 1st. location on conveyor |
| P2 | CC (LL) | Place package type 2 in simulation |
| | | CC=conveyor, LL = location |
| | | Default LL = 1st. location on conveyor |
| P3 | CC (LL) | Place package type 3 in simulation |
| | | CC = conveyor, LL = location |
| | | Default LL = 1st. location on conveyor |
| R1 | (CC) (LL) | Remove package type 1 from simulation |
| | | CC = conveyor, LL = location |
| | | Default CC = all conveyors, LL = all locations |
| R2 | (CC) (LL) | Remove package type 2 from simulation |
| | | CC = conveyor, LL = location |
| | | Default CC = all conveyors, LL = all locations |
| R3 | (CC) (LL) | Remove package type 3 from simulation |
| | | CC = conveyor, LL = location |
| | | Default CC = all conveyors, LL = all locations |
| D1 | ($CC_1$) ($CC_2$) | Display status of package type 1 |
| | | $CC_1$ = starting conveyor number |
| | | $CC_2$ = ending conveyor number |
| | | Default $CC_2$. Both field not present = status of all packages. |
| D2 | ($CC_1$) ($CC_2$) | Display status of package type 2 |
| | | $CC_1$ = starting conveyor number |
| | | $CC_2$ = ending conveyor number |
| | | Default $CC_2$ not present = display status only for $CC_1$. Both field not present = status of all packages. |
| D3 | ($CC_1$) ($CC_2$) | Display status of package type 3 |
| | | $CC_1$ = starting conveyor number |
| | | $CC_2$ = ending conveyor number |
| | | Default $CC_2$ not present = display status only for $CC_1$. Both fields not present = status of all packages. |

*( ) denotes optional parameter

5. Simulation Display

The display of the simulated system on the color graphic CRT (1) is an integral part of the invention. This display shows the operator or system engineer the current state of the simulated system at all times. The graphic and I/O data on the display is update twice a second to reflect changes in the condition of the I/O signals, the location of packages, and the simulation status. Detailed information concerning conditions of motors, solenoids, limit switches, photoelectric sensors and other devices, is continuously displayed. FIG. 8 shows a typical system under simulation with various simulated components identified. Table III identifies the simulated components referenced in FIG. 8.

TABLE III

| REFERENCE # | DEVICE REPRESENTED |
|---|---|
| 50 | Photo Electric Sensor (ON) |
| 51 | Photo Electric Sensor (OFF) |
| 52 | Simulated Package |
| 53 | Transfer Car Up/Down Controls |
| 54 | Transfer Car In/Out Motors |
| 55 | Limit Switch (OFF) |
| 56 | Limit Switch (ON) |
| 57 | Chain Transfer Up/Down Controls |
| 58 | Operator Notification Signals |
| 59 | Overhead Chain Switch |
| 60 | Conveyor Drive Motor. |
| 61 | Material Movement Path |
| 62 | Simulated Package |
| 63 | Turntable Rotation Controls |
| 64 | Simulated Transfer Car |
| 65 | Operator's Pushbuttons & Switches |

The material movement paths (61) are displayed as green lines and packages (52, 62) are superimposed on paths as segments of color. The simulated packages may be designated by a type. Each package type is displayed with a specific color. Package types may be used to designate special package or transfer mechanisms (64).

The display of the conveying system may be distorted to optimize utilization of the graphics capability. When the display is distorted, the movement characteristics and size of the package will vary from one segment to another. The operation of the simulation is determined by distances with speeds and timing. The display is only a visual representation of the simulation and does not affect any simulation timing or activity.

Figure 7:
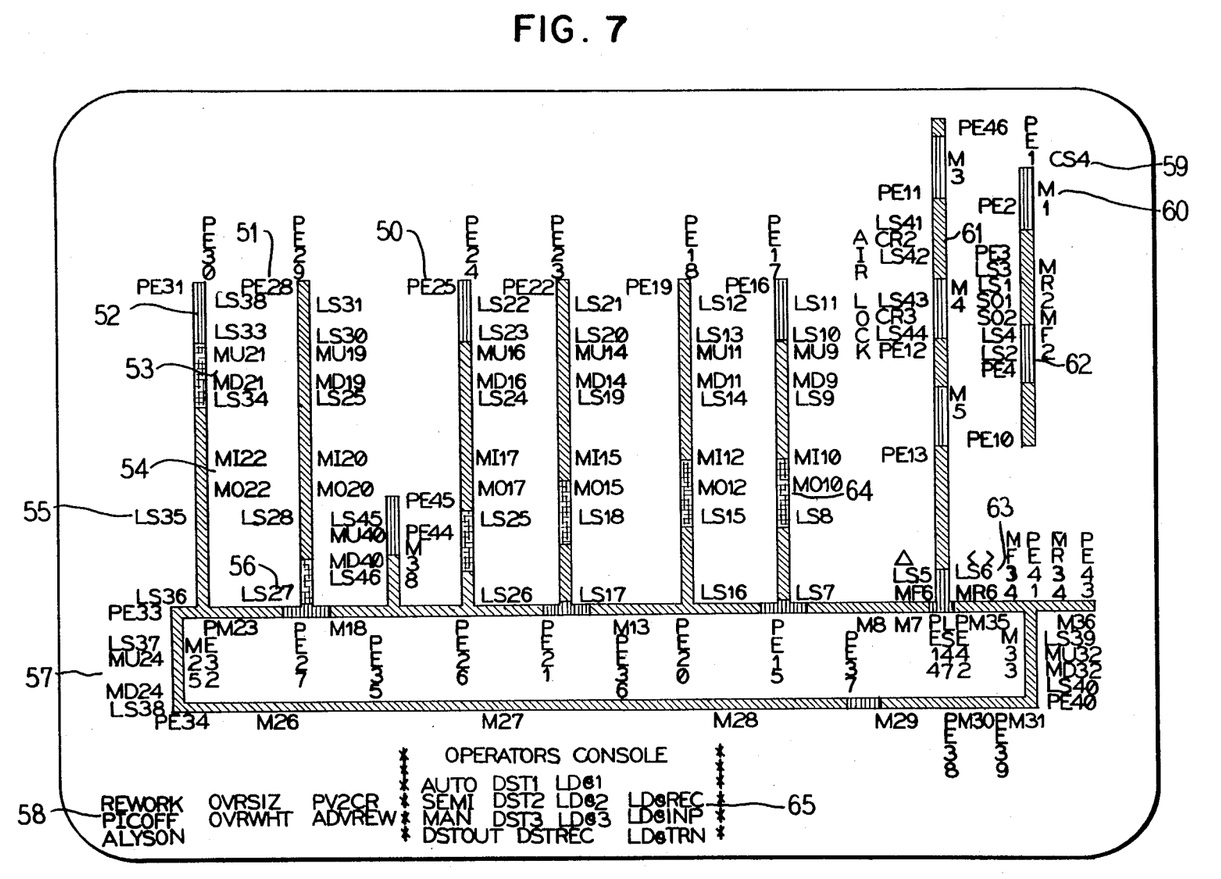
FIG. 7 is a photograph showing a typical conveying system displayed on the color graphic CRT.

All controller I/O signals are displayed on the color graphic CRT (1). Each signal has a name and color. The normal display has black background color. When the I/O signal is OFF, the signal is displayed with a black background. When the I/O signal is ON, the display is reversed, i.e., the signal name is displayed in black on a colored background. All references in FIG. 7 except 52, 61, 62, and 64 are representative I/O signals. The I/O signals are normally displayed near the physical device location in the system.

The status of the simulation is displayed on the bottom line of the color graphic CRT (2). The status line contains elapsed time, scenario information, available CPU time, controller status, simulation status, and other simulation information.

The elapsed time is the hours, minutes, and seconds that have elapsed since simulation was begun. The scenario information contains the current active scenario if any and the relative time within that scenario. The available CPU time contains the percent of CPU time in each subsystem available for use. The controller status is the status of signal transmission between the conveying system control device (5) and the invention. The simulation status contains PAUSED, ACTIVE, or STEP NN indicating the status of the simulation. The simulation information contains the number of packages available for simulation, under active simulation, and the total number of packages that have been input into the simulated system.

6. Monitoring Operations

The apparatus as described in this specification has the ability to predict the events as they will occur in the real system. The presence of a real package is detected and processed using the simulation. The events generated by the simulated operation are compared to the events occuring in the real conveying system. As long as the real events match the simulated events within a specified tolerance the conveying system is functioning properly. If the real events do not match the simulated events a malfunction has occurred. The apparatus sounds an alarm and communicates the specific malfunction or missed event to the operator or maintenance personnel.

The apparatus contains a duplicate of the input and output image of the sytem control device enabling the control output image to be updated by commands from the operator's console (2). The updated output image may be transfered to the control device (5) to activate control devices in the real system. In this manner the apparatus may be used by the operator or maintenance personnel to correct malfunctions or activate control elements. For example, a package may jam in a transfer device preventing the transfer device from returning to the home position. The maintenance personnel are notified by the apparatus that the transfer did not return to the home position when it was supposed to. The maintenance personnel clears the jam by removing the package and the transfer device returned to its home position using the apparatus.

When connected to the real system the apparatus has all data concerning the location of packages in the system, the number of packages input at the input points and the number of packages removed from the output points. This information can be displayed on the color graphic CRT (1) and the throughput or flow rates calculated and displayed.

7. Conclusion

The invention just described enables a conveying system's control logic to be tested and debugged independent of the physical system. The color graphics CRT (1) provides an effective media to observe the simulated operation. The microcomputers (11, 12, 13) provide the logic processing power necessary to exercise the entire system to check performance and flow rate. The operator's console (2) provides simple commands to operate the invention in an efficient manner. Inherent in the invention is the ability to connect to the conveying system control device (5) and provide a visual display to the actual system in operation.

While the foregoing has been described with repect to the preferred embodiment thereof, it will be understood by those of ordinary skill in the art that various changes can be made to the structure, function of the parts and steps of the invention without departing from the spirit and scope thereof.

We claim:

1. An apparatus for emulating the operation of a material conveying system, which includes discrete material handling and sensing components, said apparatus including:
   digital simulator means for storing, in a non-volatile manner, data representing discrete components of a material conveying system;
   means for interfacing said apparatus to an independent control device which operates and controls a material conveying system;
   means under operator control for interactively operating said digital simulator means for causing said control device to respond as if a material conveying system was conveying material when said material conveying system is not conveying material, and said interactive operation including starting, stopping and incremental stepping modes; and
   means for graphically displaying the simulated operation of a material conveying system by periodically depicting the position of material moving within a material conveying system and the condition of the discrete components.

2. An apparatus as in claim 1, wherein said digital simulator stores data in tabular form, representing the arrangement of the discrete components of the material conveying system and whereby modification of said tabular data modifies said arrangement.

3. An apparatus for monitoring the operation of a material conveying system, which includes discrete material handling and sensing components, said apparatus including:
   digital simulator means for storing, in a non-volatile manner, data representing discrete components of a material conveying system;
   means for interfacing said apparatus to an independent control device which operates and controls a material conveying system;

means for graphically displaying a simulated operation of a material conveying system by periodically depicting the position of material moving within a material conveying system and the condition of discrete components, wherein said discrete components include said discrete material sensing components;

means for continuously receiving data from an operating material conveying system representing the activity of said system;

means for comparing actual data with simulated data representing idealized operation of the material conveying system; and means for issuing an alarm in the event the actual data is not within predetermined operation tolerances of the simulated data, and means under operator control for interactively manipulating stored data representing discrete components of the material conveying system and operating tolerances.

4. An apparatus as in claim 3, wherein said digital simulator stores data in tabular form representing the arrangement of the material conveying system and the predetermined operating tolerances so that modification of said tabular data modifies said arrangement and the predetermined operating tolerances.

5. A plant control system comprising:
(a) a material conveying system which includes discrete material handling and sensing components;
(b) independent control means for operating and controlling said material conveying system;
(c) emulator apparatus means for cooperating in operating said system and for comparing the actual operation of said material conveying system with an idealized mode of operation of an idealized material conveying system, said emulator means including:
(1) digital simulator means for storing data representing discrete components of said material conveying system in a non-volatile manner;
(2) means for interfacing said emulator apparatus and said independent control means;
(3) means for comparing data from the actual operation of said material conveying system with data generated in said simulator means;
(4) means for issuing an alarm in the event that the actual data is not within predetermined operating tolerances of the simulated data.
(5) means for graphically displaying the operation of the material conveying system by periodically depicting the position of material moving within the material conveying system and the condition of the discrete components, wherein said discrete components include said discrete material sensing components; and
(6) means under operator control for interactively manipulating stored data representing discrete components of the material conveying system and operating tolerances.

6. An apparatus as in claim 5, wherein there is further provided:
means associated with said comparison means for activating said independent control device to prevent further operation of the material conveying system in the event said actual data is not within the predetermined limits.

7. A plant control system as in claim 5, wherein said digital simulator stores data in tabular form representing the arrangement of the discrete components of the material conveying system, whereby modification of said tabular data modifies said arrangement.

8. A method for emulating the operation of a material conveying system which includes discrete material handling and sensing components comprising the steps of:
providing and, in a non-volatile manner, storing digital data representing the discrete material handling and sensing components of a material conveying system;
interfacing with an independent control device that operates and controls a material conveying system;
causing said independent control device to operate using the stored material conveying system data, so as to check the operation of the independent control device without actually operating a material conveying system; and
graphically displaying a simulated operation of the material conveying system by periodically depicting the position of material moving within the material conveying system and the condition of the discrete components.

9. A method as in claim 8, wherein said digital data representing the arrangement of the discrete components of a material conveying system is stored in tabular form and modifying said tabular data so as to modify said arrangement.

* * * * *